(12) United States Patent
Ni et al.

(10) Patent No.: US 12,103,290 B2
(45) Date of Patent: Oct. 1, 2024

(54) LOW-TEMPERATURE DRY PREPARATION METHOD FOR FLAME-RETARDANT FABRIC, AND FLAME-RETARDANT MATTRESS COVER

(71) Applicant: HEALTHCARE CO., LTD., Rugao (CN)

(72) Inventors: Zhanggen Ni, Rugao (CN); Peng Shen, Rugao (CN)

(73) Assignee: HEALTHCARE CO., LTD., Rugao (CN)

( * ) Notice: Subject to any disclaimer, the term of this patent is extended or adjusted under 35 U.S.C. 154(b) by 390 days.

(21) Appl. No.: 17/609,762

(22) PCT Filed: May 8, 2020

(86) PCT No.: PCT/CN2020/089202
§ 371 (c)(1),
(2) Date: Nov. 8, 2021

(87) PCT Pub. No.: WO2020/224637
PCT Pub. Date: Nov. 12, 2020

(65) Prior Publication Data
US 2022/0219443 A1 Jul. 14, 2022

(30) Foreign Application Priority Data

May 8, 2019 (CN) .......................... 201910378183.3
Jan. 14, 2020 (CN) .......................... 202010038256.7

(51) Int. Cl.
*B32B 37/12* (2006.01)
*A47C 31/00* (2006.01)
(Continued)

(52) U.S. Cl.
CPC ........ *B32B 37/1207* (2013.01); *A47C 31/001* (2013.01); *B32B 5/022* (2013.01);
(Continued)

(58) Field of Classification Search
CPC ...... B32B 2262/0292; B32B 2262/062; B32B 2037/1215; B32B 37/1284
(Continued)

(56) References Cited

U.S. PATENT DOCUMENTS 3,551,231 A * 12/1970 Smedberg ............ D06N 7/0078
156/72
3,655,490 A * 4/1972 Adler ..................... D04H 11/04
156/72
(Continued)

FOREIGN PATENT DOCUMENTS

| CN | 103522726 A | 1/2014 |
|---|---|---|
| CN | 110014698 A | 7/2019 |

(Continued)

OTHER PUBLICATIONS

First Examination Opinion of 202010038256.7.
International Search Report of PCT/CN2020/089202.

*Primary Examiner* — Scott W Dodds

(57) ABSTRACT

The present invention relates to a low-temperature dry preparation method for a flame-retardant fabric, for use in compounding a first substrate with a second substrate, wherein the first substrate and the second substrate are pressed together by means of hot melt adhesive-based cold compounding: spraying and coating a surface of the first substrate with a hot metal adhesive in a flowable state, feeding the first substrate and the second substrate together into a press roller group, making the hot melt adhesive on the surface of the first substrate face the second substrate, and cold pressing the first substrate, the hot melt adhesive, and the second substrate together by means of the press roller group.

4 Claims, 1 Drawing Sheet

(51) Int. Cl.
  *B32B 5/02* (2006.01)
  *B32B 5/26* (2006.01)
  *B32B 7/12* (2006.01)
  *B32B 37/00* (2006.01)
  *B32B 37/08* (2006.01)
  *B32B 37/10* (2006.01)
  *B32B 38/18* (2006.01)

(52) U.S. Cl.
  CPC .............. *B32B 5/265* (2021.05); *B32B 7/12* (2013.01); *B32B 37/0053* (2013.01); *B32B 37/08* (2013.01); *B32B 37/10* (2013.01); *B32B 37/1284* (2013.01); *B32B 2037/1215* (2013.01); *B32B 38/1808* (2013.01); *B32B 2262/062* (2013.01); *B32B 2305/18* (2013.01); *B32B 2307/3065* (2013.01); *B32B 2309/02* (2013.01); *B32B 2317/10* (2013.01)

(58) Field of Classification Search
  USPC ........................................... 156/324
  See application file for complete search history.

(56) References Cited

U.S. PATENT DOCUMENTS

| | | | |
|---|---|---|---|
| 4,260,440 A * | 4/1981 | Frankenberg | A47C 21/048 |
| | | | 428/920 |
| 6,852,191 B2 * | 2/2005 | Bayzelon | G09F 3/10 |
| | | | 156/289 |
| 2003/0021978 A1 * | 1/2003 | Wolf | D06M 11/82 |
| | | | 428/297.4 |
| 2011/0033686 A1 * | 2/2011 | Kawka | B32B 5/026 |
| | | | 156/331.7 |
| 2017/0080454 A1 * | 3/2017 | Hidaka | B05D 5/00 |

FOREIGN PATENT DOCUMENTS

| | | |
|---|---|---|
| CN | 210047152 U | 2/2020 |
| CN | 111016309 A | 4/2020 |
| WO | WO2018006450 A1 | 1/2018 |

* cited by examiner

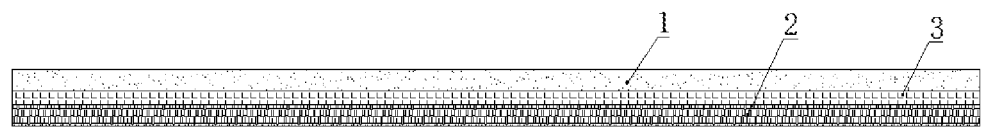

LOW-TEMPERATURE DRY PREPARATION METHOD FOR FLAME-RETARDANT FABRIC, AND FLAME-RETARDANT MATTRESS COVER

CROSS REFERENCE TO RELATED APPLICATIONS

This application is a National Stage application of International Application No. PCT/CN2020/089202 filed on May 8, 2020, which claims all benefits accruing from China Patent Application Nos. 201910378183.3, filed on May 8, 2019, and 202010038256.7, filed on Jan. 14, 2020, in the China National Intellectual Property Administration, both of which are hereby incorporated by reference.

TECHNICAL FIELD

The present disclosure relates to a low-temperature dry preparation method for a flame-retardant fabric, and a composite flame-retardant mattress cover prepared by the method.

BACKGROUND

In order to prevent fires, in addition to fire prevention measures, flame-retardant fabrics, such as flame-retardant cloths and flame-retardant work clothes, can also be used to delay an expansion of the fire, so that people have time to evacuate or take measures to extinguish the fire. Therefore, the research and development and innovation of flame retardant technology are particularly important.

Currently, in the development of flame-retardant fabrics, more emphasis is placed on factors such as flame-retardant performance and cost, but performance requirements of fabrics themselves are ignored.

In addition, the conventional method for preparing flame-retardant fabric generally includes: preparing a flame-retardant solution, padding or dipping fabric in the solution, and then baking the fabric at a high temperature. Waste water is discharged during the processing, which wastes energy. High temperature treatment will also affect the feel of the fabric, causing white fabrics to turn yellow. In addition, the flame retardant agent on the fabric will cause skin irritation and allergies when in contact with human body.

SUMMARY

A technical problem to be solved by the present disclosure is providing a low-temperature dry preparation method for flame-retardant fabric, which not only can compound fabric layers, but also can maintain comfort level of the original fabric. The present disclosure further provides a composite flame-retardant mattress cover prepared by the method.

In order to provide the technical problem above, the present disclosure provides a following technical solution. A low-temperature dry process for preparing flame-retardant fabric used to compound a first substrate and a second substrate, wherein: the first substrate and the second substrate are pressed by means of hot melt adhesive-based cold compounding: spraying or coating a hot melt adhesive in a flowable state on a surface of the first substrate and controlling $T_{w1} < T_1$, wherein $T_{w1}$ is an initial temperature of the hot melt adhesive when it contacts the surface of the first substrate, and $T_1$ is a heat deflection temperature of the first substrate; feeding the first substrate and the second substrate into a pressure roller assembly simultaneously, and controlling $T_{curing}$, $T_{w2}$, $T_2$ and $T_1$ to satisfy following formula: $T_{curing} < T_{w2}$, and $(T_{w2} - 10° C.) < T_2 < T_1$, wherein the hot melt adhesive on the surface of the first substrate faces to the second substrate, $T_{curing}$ is a curing temperature of the hot melt adhesive, $T_{w2}$ is an initial temperature of the hot melt adhesive when it contacts a surface of the second substrate, and $T_2$ is a heat deflection temperature of the second substrate; and cold pressing the first substrate, the hot melt adhesive and the second substrate by the pressure roller assembly, and controlling $T_f$ and $T_{curing}$ to satisfy following formula: $T_f < T_{curing}$ during the cold pressing, wherein $T_f$ is a pressing temperature.

In some embodiments, the $T_2$ is in a range of 55 degrees centigrade to 70 degrees centigrade.

The present disclosure further provides a low-temperature dry process for preparing a flame-retardant fabric The preparation method includes the following steps.

Step S1: unreeling a roll of a fabric layer and tiling the unreeled fabric layer on a conveyer belt, wherein the fabric layer is defined as the first substrate.

Step S2: heating the hot melt adhesive until being in the flowable state.

Step S3: spraying or coating the hot melt adhesive in the flowable state to a surface of the fabric layer with a glue nozzle assembly.

Step S4: unreeling a roll of a flame-retardant needle punched cotton layer, and feeding the flame-retardant needle punched cotton layer and the fabric layer into the pressure roller simultaneously, wherein the flame-retardant needle punched cotton layer is defined as the second substrate, the hot melt adhesive on the surface of the fabric layer faces to the flame-retardant needle punched cotton layer, and the hot melt adhesive is not absolutely solidified.

Step S5: pressing the flame-retardant needle punched cotton layer and the fabric layer by the pressure roller assembly, and controlling a temperature of the flame-retardant needle punched cotton layer and a temperature of the hot melt adhesive to be not higher than $T_{curing}$, then solidifying the hot melt adhesive and compounding the flame-retardant needle punched cotton layer and the fabric layer to form a composite flame-retardant fabric.

Step S6: reeling the composite flame-retardant fabric.

In some embodiments, the pressure roller assembler is provided with an air cooling device or a water cooling device.

The present disclosure further provides a composite flame-retardant mattress cover prepared by the low-temperature dry preparation process for flame-retardant fabric, including a first substrate and a second substrate, wherein the first substrate is a fabric layer, the second substrate is a flame-retardant needle punched cotton layer, and a hot melt adhesive layer is disposed between the flame-retardant needle punched cotton layer and the fabric layer.

In some embodiments, both the flame-retardant needle punched cotton layer and the fabric layer have porous structures. Surfaces respectively contacting the flame-retardant needle punched cotton layer and the fabric layer of the hot melt adhesive layer have microstructures, and the microstructures inserts into the porous structures of the flame-retardant needle punched cotton layer and the fabric layer by a means of cold compounding, respectively.

The present disclosure includes the following advantages.

In the present disclosure, a flame retardant material is prepared to a low-melting-point needle punched material, and a fabric layer and the flame-retardant needle punched cotton layer are pressed, so as to obtain a textile fabric having flame-retardant effect and good hand feeling. The process in the present disclosure does not need to prepare a solution and is a clean processing process without discharging waste water. The process is processed at normal temperature and is energy conservation and emission reduction. The textile fabric obtained in the present disclosure is safer and more comfortable when in contact with human body.

Currently, when the fabric layer and the flame-retardant needle punched cotton layer are bounded with a hot melt adhesive, the hot melt adhesive is commonly coated on one of the fabric layers with a coating assembly, then the fabric layer coating the hot melt adhesive or coating a glue film and another substrate are fed to a heatable pressure roller for high temperature pressing. Therefore, the hot melt adhesive is uniformly coated, and a part of the hot melt adhesive penetrates into the fabric layer and the substrate, cooled, and solidified to obtain a composite fabric layer. The method includes the following defects: when the flame-retardant needle punched cotton layer is used as the flame-retardant substrate, the flame-retardant needle punched cotton layer and the fabric layer are simultaneously fed into the pressure roller assembly and subjected to heating and pressing. Since the property of the flame-retardant needle punched cotton layer, the flame-retardant needle punched cotton layer will turn hard and thin when the temperature exceeds a certain temperature, the hand feel of the composite material is undesirable.

In the present disclosure, the fabric layer and the flame-retardant needle punched cotton layer are creatively pressed by a means of a hot melt adhesive-based cold compounding method. Since a curing temperature of the hot melt adhesive is controlled to be lower than a heat deflection temperature of the flame-retardant needle punched cotton layer, a bulking change of the flame-retardant needle punched cotton layer caused by excessive high temperature in the compounding process can be avoided.

BRIEF DESCRIPTION OF THE DRAWINGS

FIG. 1 is a structural schematic diagram of a composite flame-retardant mattress cover in the present disclosure.

DETAILED DESCRIPTION

In the present disclosure, a composite flame-retardant mattress cover can include a first substrate and a second substrate. The first substrate can be a fabric layer 1, the second substrate can be a flame retardant needle punched cotton layer 2, and a hot melt adhesive layer 3 can be disposed between the flame-retardant needle punched cotton layer 2 and the fabric layer 1. The flame-retardant needle punched cotton layer 2 and the fabric layer 1 can have porous structures. The hot melt adhesive layer 3 can have microstructures on a surface contacting the flame-retardant needle punched cotton layer 2 and a surface contacting the fabric layer 1. The microstructures inserts into the porous structures of the flame-retardant needle punched cotton layer 2 and the fabric layer 1 by a means of cold compounding.

The present disclosure provides a low-temperature dry preparation method for a flame-retardant fabric used to compound a first substrate and a second substrate, wherein the first substrate and the second substrate are pressed by means of hot melt adhesive-based cold compounding. Spraying or coating a hot melt adhesive in a flowable state on a surface of the first substrate and controlling $T_{w1} < T_1$, wherein $T_{w1}$ is an initial temperature of the hot melt adhesive when it contacts the surface the first substrate, and $T_1$ is a heat deflection temperature of the first substrate;

Feeding the first substrate and the second substrate into a pressure roller assembly simultaneously, and controlling $T_{curing}$, $T_{w2}$, $T_2$ and $T_1$ to satisfy following formula: $T_{solid} < T_{w2}$, and $(T_{w2} - 10° C.) < T_2 < T_1$, wherein the hot melt adhesive on the surface of the first substrate faces to the second substrate, $T_{solid}$ is a curing temperature of the hot melt adhesive, $T_{w2}$ is an initial temperature of the hot melt adhesive when it contacts the surface of the second substrate, and $T_2$ is a heat deflection temperature of the second substrate; and Cold pressing the first substrate, the hot melt adhesive and the second substrate by the pressure roller assembly, and controlling $T_f$ and $T_{curing}$ to satisfy following formula: $T_f < T_{curing}$ during the cold pressing, wherein $T_f$ is a pressing temperature.

The preparation method of the present disclosure will be described in detail hereinafter.

Embodiment 1

Step S1: a roll of a fabric layer was unreeled, and tiled on a conveyer belt, wherein the fabric layer was the first substrate.

Step S2: in the present embodiment, a hot melt adhesive was EVA substrate, which had a curing temperature Low in a range of 60 degrees centigrade to 110 degrees centigrade. The hot melt adhesive was heated to 150 degrees centigrade to 190 degrees centigrade to transform the hot melt adhesive to a flowable state. At such temperature, the hot melt adhesive had relative good fluidity, which facilitates the hot melt adhesive spraying out.

Step S3: the hot melt adhesive in the flowable state was sprayed to a surface of the fabric layer with a glue nozzle assembly. A spraying amount of the hot melt adhesive was in a range of 14 g/m² to 15 g/m² (by an area of the fabric layer). A rate of the fabric layer passing by the glue nozzle assembly was 2 m/min.

In the present embodiment, the fabric layer was PU (poly urethane), which had a heat deflection temperature $T_1$ in a range of 100 degrees centigrade to 160 degrees centigrade. Therefore, an initial temperature $T_{w1}$ of the hot melt adhesive when it contacted the first substrate was controlled to be lower than the heat deflection temperature of the fabric layer, for example in a degree of 95 degrees centigrade to 155 degrees centigrade, so as to avoid deformation of the fabric layer.

Generally, the initial temperature of the hot melt adhesive when it contacted the first substrate cannot be directly controlled. Generally, the initial temperature $T_{w1}$ of the hot melt adhesive when it contacted the first substrate was controlled by controlling a temperature of the glue nozzle assembly, and in combination with controlling a distance between the glue nozzle assembly and the fabric layer.

One of ordinary skill in the art should understand that in order to keep the hot melt adhesive in the flowable state and to facilitate the compounding process, the initial temperature $T_{w1}$ of the hot melt adhesive when it contacted the first substrate should be around the critical point of the heat deflection temperature of the fabric layer. For example, in some embodiments, when the PU had a heat deflection temperature of 100 degrees centigrade, an initial temperature of the hot melt adhesive when it contacted the surface of the first substrate can be designed about 1 degrees centigrade to 5 degrees centigrade lower than 100 degrees centigrade, i.e., optimally between 95 degrees centigrade to 99 degrees centigrade. In some embodiments, another PU was used as the fabric layer. When the PU had a heat deflection temperature of 160 degrees centigrade, an initial temperature of the hot melt adhesive when it contacted the surface of the first substrate can be designed about 5 degrees centigrade to 8 degrees centigrade lower than 160 degrees centigrade, i.e., optimally between 152 degrees centigrade to 155 degrees centigrade.

Step S4: The flame-retardant needle punched cotton layer was the second substrate. A heat deflection temperature $T_2$ of the flame-retardant needle punched cotton layer was generally in a range of 55 degrees centigrade to 70 degrees centigrade.

Then a roll of the flame-retardant needle punched cotton layer was unreeled. The unreeled flame-retardant needle punched cotton layer and the fabric layer was simultaneously fed to the pressure roller assembly. The hot melt adhesive on the fabric layer faced to the flame-retardant needle punched cotton layer.

In the present process, an initial temperature $T_{w2}$ of the hot melt adhesive when it contacts the flame-retardant needle punched cotton layer should be controlled.

A upper limit of $T_{w2}$ of the hot melt adhesive should be controlled to be lower than 65 degrees centigrade to 75 degrees centigrade. That is, $T_{w2}$ should be ensured to be not higher than 10 degrees centigrade above the heat deflection temperature $T_2$ of the flame-retardant needle-punched cotton layer. When the temperature was within the upper limit, by using the heat transfer after the material itself contacts and the flame-retardant needle punched cotton layer not in a compressed state, the flame-retardant needle-punched cotton layer had almost no deformation influence in its own thickness direction.

A lower limit of the temperature of the hot melt adhesive was at least 60 degrees centigrade to 110 degrees centigrade higher than the curing temperature $T_{curing}$ of the hot melt adhesive, in case completely solidification of the hot melt adhesive before pressure compounding.

In the present embodiment, the initial temperature $T_{w2}$ of the hot melt adhesive when it contacts the surface of the second substrate was controlled to be 5 degrees centigrade to 7 degrees centigrade higher than actual curing temperature of the hot melt adhesive, making the hot melt adhesive in a state not completely cured with certain fluidity.

At the same time, for the convenience of observation and considering the influence of the fluidity of the hot-melt adhesive on the distribution of the hot-melt adhesive, in this process, the surface where the hot-melt adhesive is sprayed on the fabric layer faced upward.

Step S5: the flame-retardant needle punched cotton layer and the fabric layer were pressed by pressure roller assembly.

In order to achieve a composite fabric having good hand feel and maintaining the characteristics of the original fabric, an air cooling device or a water cooling device were set at the pressure roller assembly to control the pressing temperature. During pressing process, both the temperature of the flame-retardant needle punched cotton layer and the temperature of the hot melt adhesive were controlled to be not higher than $T_{curing}$. In turn, the hot melt adhesive was cured to combine the flame-retardant needle punched cotton layer and the fabric layer to form a flame-retardant composite fabric layer, while avoiding deformation of the flame-retardant needle punched cotton layer under pressure due to excessive temperature.

Step S6: the composite flame-retardant fabric was reeled to obtain a composite flame-retardant fabric roll which maintained original performances of the first substrate fabric.

Embodiment 2

In the present disclosure, the specific steps were substantially the same with those in embodiment 1, and the differences between embodiment 1 and the present embodiment were shown hereinafter.

The first substrate was PU, but a heat deflection temperature of the PU was in a range of 125 degrees centigrade to 135 degrees centigrade. The hot melt adhesive was PU substrate. The hot melt adhesive should be heated to 170 degrees centigrade to 180 degrees centigrade to make the hot melt adhesive to transform into a flowable state. A temperature of the glue nozzle assembly was controlled to be in a range of 145 degrees centigrade to 150 degrees centigrade. A spraying amount of the hot melt adhesive was controlled in a range of 13 $g/m^2$ to 16 $g/m^2$, and the first substrate was fed to the pressure roller at a rate of 4.5 m/min to compound with the second substrate. In the present embodiment, the first substrate and the second substrate were excellently compounded, and the composite fabric maintained soft and smooth performances of the original PU.

Embodiment 3

In the present disclosure, the specific steps were substantially the same with those in embodiment 1, and the differences between embodiment 1 and the present embodiment were shown hereinafter.

In the present embodiment, the first substrate was sofa cloth, which had a heat deflection temperature in a range of 162 degrees centigrade to 170 degrees centigrade. The hot melt adhesive was TPU substrate. The hot melt adhesive should be heated to 180 degrees centigrade to 190 degrees centigrade to make the hot melt adhesive to transform into a flowable state. A temperature of the glue nozzle assembly was controlled to be in a range of 135 degrees centigrade to 140 degrees centigrade. A spraying amount of the hot melt adhesive was controlled in a range of 19 $g/m^2$ to 20 $g/m^2$, and the first substrate was fed to the pressure roller at a rate of 4 m/min to compound with the second substrate. In the present embodiment, the first substrate and the second substrate were excellently compounded, and the composite fabric maintained performances of the sofa cloth.

Embodiment 4

In the present disclosure, the specific steps were substantially the same with those in embodiment 1, and the differences between embodiment 1 and the present embodiment were shown hereinafter.

In the present embodiment, the first substrate was an air layer fabric, which had a heat deflection temperature in a range of 220 degrees centigrade to 230 degrees centigrade. The hot melt adhesive was PA substrate. The hot melt adhesive should be heated to 155 degrees centigrade to 165 degrees centigrade to make the hot melt adhesive to transform into a flowable state. A temperature of the glue nozzle assembly was controlled to be in a range of 140 degrees centigrade to 145 degrees centigrade. A spraying amount of the hot melt adhesive was controlled in a range of 12 $g/m^2$ to 14 $g/m^2$, and the first substrate was fed to the pressure roller at a rate of 3.6 m/min to compound with the second substrate. After the pressing process, the first substrate was completely bonded to the second substrate, but the viscosity was relatively small. The composite fabric had a soft hand felling, and maintained performances of the original air layer fabric, and the hot melt adhesive layer at the bonding surface was not yellowing or black.

Parameters of samples of the embodiments in the present disclosure are shown in the table hereinafter.

|  | Testing standard | Embodiment 1 | Embodiment 2 | Embodiment 3 | Embodiment 4 |
|---|---|---|---|---|---|
| pH | GB 18401-2010 National general safety technical code for textile products | 7.45 | 7.48 | 7.48 | 7.46 |
| Color fastness to rubbing (dry rubing) | GB T 22843-2009 Cushion and pillow | 5 | 5 | 5 | 5 |
| Color fastness to rubbing (wet rubing) | GB T 22843-2009 Cushion and pillow | 5 | 5 | 5 | 5 |
| Color fastness to washing with soap | GB T 22843-2009 Cushion and pillow | 5 | 5 | 5 | 5 |
| Dimensional change rate to washing (%) | GB T 22843-2009 Cushion and pillow | 0.1 | 0.1 | 0 | 1 |

Conclusion: pH values of the samples were A grade according to GB 18401-2010 *National general safety technical code for textile products*, and color fastness of the samples were superior product according to GB T 22843-2009 *Cushion and pillow*.

The technical features of the above-described embodiments may be combined in any combination. For the sake of brevity of description, all possible combinations of the technical features in the above embodiments are not described. However, as long as there is no contradiction between the combinations of these technical features, all should be considered as within the scope of this disclosure.

The above-described embodiments are merely illustrative of several embodiments of the present disclosure, and the description thereof is relatively specific and detailed, but is not to be construed as limiting the scope of the disclosure. It should be noted that a number of variations and modifications may be made by those skilled in the art without departing from the spirit and scope of the disclosure. Therefore, the scope of the disclosure should be determined by the appended claims.

We claim:

1. A low-temperature dry preparation method for forming a flame-retardant fabric from a first substrate and a second substrate, the method comprising:
   step S1: unreeling a roll of the first substrate and laying the first substrate on a conveyer belt, wherein the first substrate is a fabric layer;
   step S2: heating a hot melt adhesive until being in a flowable state;
   step S3: spraying or coating the hot melt adhesive in the flowable state to a surface of the first substrate with a glue nozzle assembly, and controlling $T_{w1}$ to satisfy a relationship: $(T_1-5° C.)<T_{w1}\leq(T_1-1° C.)$, wherein $T_{w1}$ is an initial temperature of the hot melt adhesive when it contacts the surface of the first substrate, and $T_1$ is a heat deflection temperature of the first substrate;
   step S4: unreeling a roll of the second substrate, and feeding the second substrate and the first substrate into a pressure roller simultaneously, wherein the second substrate is a flame-retardant needle punched cotton layer, the hot melt adhesive on the surface of the first substrate faces to the second substrate, the hot melt adhesive is not absolutely solidified, and controlling $T_{curing}$, $T_{w2}$, $T_2$ and $T_1$ to satisfy following formula: $T_{curing}<T_{w2}$, and $(T_{w2}-10° C.)<T_2<T_1$, wherein $T_{curing}$ is a curing temperature of the hot melt adhesive, $T_{w2}$ is an initial temperature of the hot melt adhesive when it contacts a surface of the second substrate, and $T_2$ is a heat deflection temperature of the second substrate; and
   step S5: cold pressing the first substrate, the hot melt adhesive and the second substrate by a pressure roller assembly, and controlling $T_f$ and $T_{curing}$ to satisfy following formula: $T_f<T_{curing}$ during the cold pressing, wherein $T_f$ is a pressing temperature, then solidifying the hot melt adhesive and compounding the second substrate and the first substrate to form a composite flame-retardant fabric.

2. The preparation method of claim 1, wherein the $T_2$ is in a range of 55 degrees centigrade to 70 degrees centigrade.

3. The preparation method of claim 1, wherein after the step S5, the preparation method further comprises following step:
   step S6: reeling the composite flame-retardant fabric.

4. The preparation method of claim 3, wherein the pressure roller assembly is provided with an air cooling device or a water cooling device.

* * * * *